INVENTORS J. P. VAN DER ZIEL
L. G. VAN UITERT
BY
*George S. Indig*
ATTORNEY

United States Patent Office 3,591,517
Patented July 6, 1971

3,591,517
RARE EARTH TERMINATED TRANSITION
METAL LASERS
Jan P. van der Ziel, Chatham, and Le Grand G. van
Uitert, Morris Township, Morris County, N.J., assignors
to Bell Telephone Laboratories, Incorporated, Murray
Hill, N.J.
Filed Feb. 12, 1969, Ser. No. 798,586
Int. Cl. C09k 1/04, 1/54; H01s 3/16
U.S. Cl. 252—301.4R                                4 Claims

ABSTRACT OF THE DISCLOSURE

Type II (three level) transition metal lasers (such as those dependent on $Cr^{3+}$) are converted to Type III (four-level) by coupling the transition metal ion to an appropriate rare earth ion. Suitable rare earths, included as cations of the host composition, include cerium, europium, terbium, praseodymium, and ytterbium.

BACKGROUND OF THE INVENTION

(1) Field of the invention

The invention is concerned with optically pumped solid state lasers.

(2) Description of the prior art

Of the multitude of solid state compositions which have been proposed, attention has been directed largely to those dependent upon rare earth or transition metal ion emission. From a commercial standpoint, the field is still further narrowed to those utilizing trivalent chromium or trivalent neodymium. For continuous (CW) room temperature operation, $Cr^{3+}$ is no longer a serious contender and only $Nd^{3+}$ remains (although a small number of other trivalent rare earth lasers have been made to so operate on a laboratory scale).

$Cr^{3+}$ lasers are sometimes known as Type II lasers. This indicates that the relevant energy states are three in number with pumping raising the atom energy from a ground state to an excited state, with relaxation occurring to an intermediate or metastable state, and stimulated emission occurring for the energy drop between this metastable state and the ground state. In $Cr^{3+}$, in fact, in class II materials in general, the pumping band is broad, that is, the excited state is made up of many closely spaced levels; and, accordingly, the system is characterized by high pumping efficiency. The minimum or threshold condition for laser action is proportional to the difference in the populations of the metastable and terminal states. Since in a Type II laser the terminal state is the ground state which, by definition, is initially populated, the threshold is high. CW laser action is, therefore, difficult to achieve. Once over the high threshold, the performance is good and high power can be achieved in pulsed operation.

$Nd^{3+}$ lasers are Type III lasers. Such devices may be considered to be Type II devices to which has been added a fourth level intermediate the metastable and ground states. Pumping again results in an energy increase corresponding with a transfer from the ground state to an upper excited state in the pumping band. The energy level then drops, typically, by radiationless emission, to a metastable state. This is followed by stimulation to a lower level, however, above the ground state, and finally by relaxation, again, typically by a radiationless process to the ground state from which the cycle is repeated. In $Nd^{3+}$, the terminal state (referring to the lower of the levels defining stimulated emission) is essentially unpopulated at room temperature. Threshold is consequently very low and laser action is quite easily obtained.

Highest frequency $Nd^{3+}$ laser emission is typically at a wavelength of $1.06\mu$ (microns) although this may be made to vary slightly depending on the host. Still operating in a four-level system, emission may also be made to occur at about $1.34\mu$. $Nd^{3+}$ lasers are extremely useful at fundamental emission frequencies and other emission wavelengths may be obtained parametrically or by use of second harmonic generators. Nevertheless, it is desirable to develop other Type III lasers operating at other fundamental frequencies for a variety of reasons. For example, fundamental $Nd^{3+}$ emission is rather difficult to detect with more present day detectors. Also, while SHG operation is now quite efficient, practical difficulties remain in the development of a commercially acceptable down-shifting variable-frequency parametric oscillator. For many purposes, it may be considered that expedient CW room temperature operation can now be obtained only for the two fundamental $Nd^{3+}$ wavelengths and for their second harmonics.

SUMMARY OF THE INVENTION

The high threshold of $Cr^{3+}$ and other transition metal ion lasers is overcome by adding a new terminal level sufficiently removed from the ground state such that it is essentially unpopulated over a broad temperature range. The new terminal level is introduced by coupling the transition metal ion to a rare earth ion which has an appropriate energy level for the terminal state. Such a system may be treated as a Type III device in which stimulation occurs between the metastable state and some terminal state which is separated from ground by an amount equal to the separation between the rare earth ground and concerned elevated state.

Broadly, the invention contemplates the use of the transition metal ions, trivalent chromium, divalent cobalt, vanadium, manganese and nickel or the quardrivalent ion of manganese. The trivalent rare earth ions, cerium, europium, terbium, praseodymium, or ytterbium may be coupled to the three transition metal ions to result in useful Type III laser action.

As will be discussed in detail, the preferred embodiment utilizes the transition metal, chromium, and this is based largely on the fact that chromium emission, typically at about $0.694\mu$, is at a shorter wavelength than either cobalt or nickel. The preferred rare earth is cerium. While the reasons for this choice are complex, a large factor is the relatively low energy level of the contributed terminal state, thereby resulting in a relatively small increase in wavelength of the emission.

Appropriate host materials will be considered in some detail. Since coupling occurs by short range interactions, it is desirable that rare earth and transition metal ions be nearest or at least next nearest neighbors. Transition metal ions typically are self-quenching in large concentration. Suitable materials, therefore, contain large numbers of rare earth ions and relatively small numbers of transition metal ions. This is most easily achieved in a host containing the rare earth as a cation. To accommodate the transition metal, it is desirable that there also be a cation position of a suitably smaller dimension than that of the rare earth. Chemical systems include the rare earth aluminates, gallates, germanates, etc.

DETAILED DESCRIPTION

Figure 1:
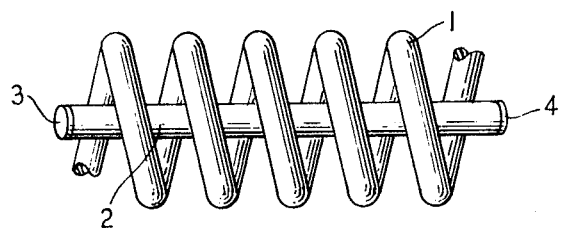
FIG. 1 is a perspective view of an optically pumped laser utilizing a composition of the invention as the active medium.

The device shown in FIG. 1 is a typical optically-pumped laser consisting of pump 1 and laser rod 2, the latter provided with end coatings 3 and 4. For oscillator use, one end coating, perhaps at 3, is totally reflecting, at least for the wavelength of concern, while coating 4 is at least partially transmitting. With the exception of the composition of rod 2, the arrangement is orthodox and further description is not appropriately included in this disclosure. A detailed description is found in Modern Optics, 1965, Reinhold Publishing Corporation, at page 571 et seq.

Figure 2:
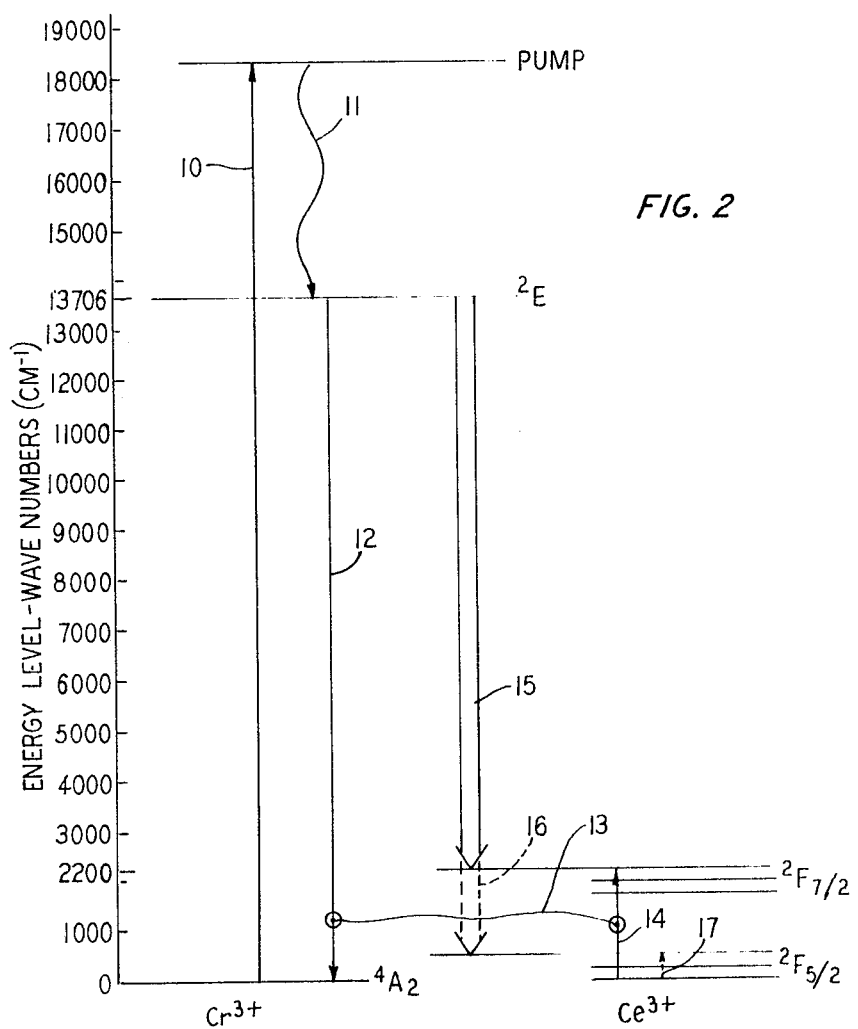
FIG. 2 is an energy level diagram for a coupled system in accordance with the invention.

FIG. 2 is an energy level diagram for the illustrative system $Cr^{3+}$–$Ce^{3+}$ in accordance with the invention. The diagram is generalized to the extent that specific effects of crystal fields for any particular host are not considered. Such effects are, in any event, relatively minor. For purposes of discussion, it may be assumed that the host is $CeAlO_3$ containing a partial substitution of the order of 1 atom percent of $Cr^{3+}$ for $Al^{3+}$. Host compositions will be discussed in detail in a later section.

The diagram of FIG. 2 is expressed in ordinate units of wave numbers (cm.$^{-1}$). This is a convenient unit for discussion of fine wavelength dimensions. It may be converted to angstrom units (A.) or microns ($\mu$) in accordance with the relationship $$\text{Wave number (cm.}^{-1}) = \frac{10^8}{\text{wavelength-A.}} = \frac{10^4}{\text{wavelength-}\mu}$$

The conventional Type II (three-level) unmodified transition metal ion laser may be discussed in terms of the figure. The lefthand portion of the diagram shows typical levels for the chromium system. Initial population is almost entirely at the chromium ground state ($^4A_2$) and optical pumping increases the energy level to a series of closely spaced levels represented by a single level denoted "pump" via route 10. From this pumping band, the energy level then drops by a spontaneous process 11 to level $^2E$. Stimulated emission corresponds with a drop in energy from $^2E$ to $^4A_2$ represented by route 12. The threshold for such stimulated emission is proportional to the difference in populations of the ground state $^4A_2$ and the metastable state $^2E$.

The two ground state manifolds are represented for trivalent cerium on the right side of the diagram. In a typical host, the level in the upper manifold ($^2F_{7/2}$) lies about 2200 wave numbers above the ground state. In a typical host, the uppermost level of the lower manifold ($^2F_{5/2}$) is about 500 wave numbers above the ground state. In accordance with the invention, one or the other such level effectively becomes the terminal state for the chromium emission. It is believed that the actual mechanism involves stimulated $Cr^{3+}$ emission to its ground state with an energy transfer to $Ce^{3+}$ elevating that ion to some higher level. In FIG. 2, this is represented by bonding line 13 joining energy change lines 12 and 14. The transfer represented by 12 has been discussed. In this illustration, 14 represents an increase in $Ce^{3+}$ energy from the ground state to a $^2F_{7/2}$ level. The effective emission of $Cr^{3+}$, whose photon energy is reduced by an amount corresponding with 2200 wave numbers (the energy increase in $Ce^{3+}$), is depicted as a double line arrow 15. The alternative mechanism, in accordance with which termination occurs at an elevation from ground corresponding with about 500 wave numbers is depicted in terms of the broken double line arrow extension 16 and broken energy change line 17.

For the illustrative cases shown in FIG. 2, emission is decreased by either 2200 cm.$^{-1}$ or 500 cm.$^{-1}$. Since $Cr^{3+}$ typically emits at about 13,760 wave numbers, the resultant rare earth terminated emission is at 11,560 cm.$^{-1}$ or 13,260 cm.$^{-1}$ corresponding with wavelengths of 8650 A. or 7550 A. The first value is just beyond the edge of the visible spectrum while the second is well within the infrared spectrum. While the shorter wavelength is preferable for many purposes, its threshold is somewhat higher since all of the $^2F_{5/2}$ levels are populated to some extent at usual operating temperatures. The $^2F_{7/2}$ levels, by contrast, are substantially unpopulated at room temperature. Selection between the two terminations is made by use of appropriate dielectric coatings (at 3 and/or 4 in the device of FIG. 1).

$Ce^{3+}$ is a particularly desirable rare earth for at least two reasons: It has a relatively low energy upper ground state manifold which is unpopulated under usual conditions yet is sufficiently removed from the ground state to permit termination, and there are no further energy levels above the ground state multiplet so that nonradiative quenching of the $Cr^{3+}$ fluorescence is not likely to occur.

Other trivalent rare earth ions which may produce termination of $Cr^{3+}$ emission are europium, terbium, ytterbium, and praseodymium. Energy levels above the ground state multiplet are permitted in all of these ions. Elevated levels are sufficiently reduced from the $^2E$ $Cr^{3+}$ level in the usual host to prevent non-radiative energy transfer from the chromium. In addition, the existence of energy levels in certain of the rare earths above the $^2E$ or pump level in $Cr^{3+}$ gives rise to the possibility of a pumping contribution. Generally speaking, however, appropriate absorption levels in the rare earth are sufficiently removed such that this contribution is insubstantial.

The listed rare earths, other than cerium, are somewhat disadvantageous in that the resulting termination levels for the transition metal (assuming use of a depopulated manifold) are somewhat higher than that of $Ce^{3+}$. The result is increased reduction in photon energy and, therefore, emission further out in the infrared spectrum. In europium, for example, termination at about 5000 wave numbers in a $^7F_6$ level results in emission at about 12,200 A. The other listed rare earths produce termination at still higher levels with ytterbium resulting in emission at about 27,000 A.

Where termination is on a depopulated cerium level, chromium may be replaced by divalent vanadium, manganese, cobalt or nickel or quadrivalent manganese. Terminated emission in the latter two systems is well out in the infrared spectrum. $Co^{2+}$ emits at a value of about 6800 wave numbers to the ground state while $Ni^{2+}$ emits at about 6500 wave numbers. Termination on a crystal field level results in a further reduction of about 500 wave numbers. Termination in the next higher manifold results in a reduction of about 2200 wave numbers. Cobalt and nickel emission may also be terminated on a crystal field level in other of the listed rare earths. Termination of cobalt or nickel emission on a depopulated level may not occur for ytterbium or praseodymium, and only europium and terbium (in addition to cerium) have a depopulated level removed from the ground state by a photon energy less than that of the ground state emission of either of these transition metal ions. $V^{2+}$ and $Mn^{4+}$ as is known have approximately the same energy levels as $Cr^{3+}$ and may therefore be substituted for chromium in an appropriate host.

Composition

Interactions between the transition metal and the rare earth are short range and occur efficiently only where the ions are nearest or at least next nearest neighbors. It is well known that the transition metals self-quench at relatively low concentrations, and, so materials suitable for this invention are typically hosts including the selected rare earth as a cation in which there is dissolved an appropriate amount of the transition metal. A preferred host is a mixed cation compound with cations in the valence states of the transition metal and rare earth ions and having a structure such as to accept a large cation (about 1 A. in diameter—this for the rare earth) and a relatively small cation (transition metal about 0.6 A. in diameter). Of course, other hosts are permitted. Cation valences other than 3+ (or 4+ in the instance of $Mn^{4+}$) may be compensated for by other cations of reduced or increased change. Deviation from optimum site dimensions, particularly for the transition metal which is included in relatively small amount, may be tolerated and, as in other solid state lasers, glasses may be used as hosts. Examples of preferred mixed cation hosts are the rare earth aluminates both of the stochiometry $R.E.AlO_3$ and $R.E._3Al_5O_{12}$, and other oxides such as gallates, germanates and silicates of either stoichiometry and also mixed cation fluorides, germanates, silicates, et cetera.

The permitted range of transition metal ion concentration is that already found acceptable in Type II lasers. The general range is from 0.01 to 2 atom percent based on the total number of cations. Below 0.01%, threshold values are significantly increased, and concentration significantly above 2% results in self-quenching. The fact that interaction is short range gives rise to the requirement that at least 10 atom percent of the total cations be the selected rare earth. There is no upper limit on the content of the rare earth ion. In the simpler mixed cation stoichiometry set forth above, the nominal rare earth content is 50 atom percent based on total cation content. Providing sufficient solubility for the transition metal is retained, the rare earth content may rise to a level of 98 atom percent or higher. All of the host compositions set forth are known and have been crystallized. Preparation of crystalline materials depending on composition may be by flux growth. Bridgeman, Verneuil or Czochralski growth. Preparation of some of these compositions may follow the description contained in Nassau, K. & Van Uitert, L. G., J. Appl. Phys. 31 1508 (1960); and Van Uitert, L. G., Grodkiewicz, W. H., Dearborn E. F., J. Am. Ceram. Soc. 49, 105 (1965)

General requirements of the host are well known. For example, there must be adequate transparency. In this case, both for the emission to the ground state and for the terminated emission, and there must be a minimum of scattering. Where separation of relevant levels is small, phonon energies should be substantially smaller, materials should have requisite mechanical properties, et cetera. These general requirements do not differ from other solid state laser hosts.

The main objective of the invention is to provide CW output wavelengths different from those already available. For certain purposes, however, pulsed action continues to be useful and the value of the terminated mechanism in this connection should not be overlooked.

What is claimed is:

1. Optically pumped solid state laser consisting essentially of a host which is a single crystal of a mixed cation compound of a first and second cation, the first said cation being a transition metal ion which is selected from the group consisting of the ions of trivalent chromium, divalent vanadium, manganese, cobalt and nickel, and the quadrivalent ion of manganese, in which emission is stimulated from an excited state of said transition metal ion, characterized in that the said transition metal ion is energetically coupled with a second cation, the said second cation being selected from the group consisting of the trivalent ions of cerium, europium and terbium for any of the said transition metal ions and praseodymium and yetterbium as well, where the transition metal is selected from the group consisting of vanadium, chromium and manganese, said second cation having an energy level of lower population than its ground state such that the photon energy of the transition metal emission is reduced by an amount approximately equal to the separation between the said level and said ground state of the second cation, and in which the said mixed cation compound is selected from the group consisting of aluminates, gallates, germanates, silicates and fluorides.

2. Laser of claim 1 in which the said rare earth level is substantially depopulated at room temperature.

3. Laser of claim 1 in which the transition metal content is within the range of from 0.01 to 2 atom percent based on total cation content, and in which the said rare earth ion content is at least 10 atom percent of the total cation content.

4. Laser of claim 1 in which the transition metal ion is $Cr^{3+}$ and the rare earth ion is $Ce^{3+}$.

References Cited

UNITED STATES PATENTS

| 3,405,371 | 10/1968 | Johnson et al. | 252—301.4 |
|---|---|---|---|
| 3,500,232 | 3/1970 | Geuisic et al. | 252—301.4 |

ROBERT D. EDMONDS, Primary Examiner

U.S. Cl. X.R.

252—301.4F; 330—4.3; 331—94.5